United States Patent
Higashiyama

(10) Patent No.: US 9,169,938 B2
(45) Date of Patent: Oct. 27, 2015

(54) FORWARD CHECK VALVE AND FUEL CELL SYSTEM

(71) Applicant: Murata Manufacturing Co., Ltd., Nagaokakyo-shi, Kyoto-fu (JP)

(72) Inventor: Yuzo Higashiyama, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 209 days.

(21) Appl. No.: 13/764,117

(22) Filed: Feb. 11, 2013

(65) Prior Publication Data

US 2013/0171537 A1    Jul. 4, 2013

Related U.S. Application Data

(63) Continuation of application No. PCT/JP2011/067125, filed on Jul. 27, 2011.

(30) Foreign Application Priority Data

Aug. 20, 2010 (JP) ................................. 2010-184876

(51) Int. Cl.
   F16K 15/18    (2006.01)
   F16K 17/22    (2006.01)
   (Continued)

(52) U.S. Cl.
   CPC ............ *F16K 15/18* (2013.01); *F16K 31/1266* (2013.01); *H01M 8/04201* (2013.01); *H01M 8/1011* (2013.01); *Y02E 60/50* (2013.01); *Y10T 137/7869* (2015.04)

(58) Field of Classification Search
   CPC .................. A61M 2039/246; A61M 2039/242; H01M 8/04; F16K 15/18; F16K 17/22
   USPC .............................. 429/400–535; 137/859, 517
   See application file for complete search history.

(56) References Cited

U.S. PATENT DOCUMENTS 3,787,022 A * 1/1974 Wilcox ........................ 251/212
4,712,583 A * 12/1987 Pelmulder et al. ............ 137/852
(Continued)

FOREIGN PATENT DOCUMENTS

JP    H6-85977 U    12/1994
JP    11-270717 A   10/1999
(Continued)

OTHER PUBLICATIONS

Takahashi et al. WO 2009/157474. Dec. 30, 2009. English translation by EPO.*

(Continued)

*Primary Examiner* — Kenneth Douyette
*Assistant Examiner* — James Lee
(74) *Attorney, Agent, or Firm* — Keating & Bennett, LLP

(57) ABSTRACT

A forward check valve and a fuel cell system in which fluid control is performed with increased reliability when a highly active fluid is used are structured such that when an edge portion of a cap is joined to an edge portion of a valve housing, a peripheral edge portion of a diaphragm is pushed and sandwiched by a peripheral edge portion of the cap and a placement portion. Further, the diaphragm is formed of rubber. As a result, the peripheral edge portion of the diaphragm is compressed by the peripheral edge portion of the cap and the placement portion, so that the degree of contact at a contact portion between the placement portion and the peripheral edge portion of the diaphragm becomes very high. Consequently, in the forward check valve, joints of the members including a joint of the edge portion of the cap and the edge portion of the valve housing do not contact methanol.

20 Claims, 10 Drawing Sheets

(51) Int. Cl.
*H01M 8/04* (2006.01)
*F16K 31/126* (2006.01)
*H01M 8/10* (2006.01)

(56) References Cited

U.S. PATENT DOCUMENTS

| | | | |
|---|---|---|---|
| 6,089,271 A * | 7/2000 | Tani | 137/854 |
| 6,089,272 A * | 7/2000 | Brand et al. | 137/859 |
| 6,155,290 A | 12/2000 | Nakajima et al. | |
| 6,280,867 B1 * | 8/2001 | Elias | 429/423 |
| 2004/0231733 A1 | 11/2004 | Nakamura | |
| 2007/0026269 A1 * | 2/2007 | Nakakubo | 429/13 |
| 2008/0086077 A1 * | 4/2008 | Seto et al. | 604/48 |
| 2009/0095363 A1 | 4/2009 | Nakakubo et al. | |

FOREIGN PATENT DOCUMENTS

| | | | |
|---|---|---|---|
| JP | 2004-031199 A | 1/2004 | |
| JP | 2004-334755 A | 11/2004 | |
| JP | 2006-163733 A | 6/2006 | |
| JP | 2008-59053 A | 3/2008 | |
| JP | 2008-059093 A | 3/2008 | |
| JP | 2008-111525 A | 5/2008 | |
| JP | 2008-128375 A | 6/2008 | |
| JP | 2010-025180 A | 2/2010 | |
| WO | WO 2009/157474 * | 12/2009 | F16K 31/02 |

OTHER PUBLICATIONS

Official Communication issued in International Patent Application No. PCT/JP2011/067125, mailed on Aug. 23, 2011.

Official Communication issued in corresponding Japanese Patent Application No. 2012-529541, mailed on Feb. 25, 2014.

* cited by examiner

FORWARD CHECK VALVE AND FUEL CELL SYSTEM

BACKGROUND OF THE INVENTION

1. Field of the Invention

The present invention relates to a forward check valve that controls a flow of a fluid in a forward direction, and to a fuel cell system including the forward check valve.

2. Description of the Related Art

A pressure reducing valve provided for passive driving and used in a small fuel cell is disclosed in Japanese Unexamined Patent Application Publication No. 2008-59093. The pressure reducing valve is formed so that, when the pressure of a fluid becomes a set pressure, the valve automatically opens or closes by making use of a pressure difference.

FIGS. 1A and 1B are each a sectional view of the pressure reducing valve that is disclosed in Japanese Unexamined Patent Application Publication No. 2008-59093. The pressure reducing valve includes a diaphragm 1, a piston 2, a valve seat 3, a valve body 4, and a supporting portion 5. The diaphragm 1 is a movable section. The piston 2 is a transmission mechanism. The valve seat 3, the valve body 4, and the supporting portion 5 constitute a valve portion. The valve body 4 is supported along a periphery thereof by the supporting portion 5. The supporting portion 5 is formed of a resilient bar. Here, each of these members is a plate member. The pressure reducing valve is manufactured by joining each of these members.

Pressure at a top portion of the diaphragm (movable section) 1 is P0, primary pressure at an upstream side of the valve is P1, pressure at a downstream side of the valve is P2, the area of the valve body 4 is S1, and the area of the diaphragm (movable section) 1 is S2. Here, from the equilibrium of the pressures, as shown in FIG. 1B, the condition for opening the valve is $(P1-P2)S1<(P0-P2)S2$. If P2 is higher than the pressure of this condition, the valve closes, whereas, if P2 is lower than the pressure of this condition, the valve opens. This makes it possible to maintain P2 at a constant value.

For example, a direct methanol fuel cell (DMFC) includes a pump that transports fuel (methanol). In general, although a valve-system pump is provided with a valve non-returning function, the valve-system pump is not provided with a valve forward check function (a function of checking or stopping a flow in a forward direction). If a pump that is not provided with a forward check function is used, when an upstream-side pressure (pressure in a forward direction) is applied to the fuel, the fuel flows even when the pump is not operating.

The temperature of a fuel cartridge that is built in a fuel cell system may become high due to the external environment, as a result of which high-pressure fluid may be discharged. This causes excess fluid to be supplied to a fuel cell, as a result of which the pump may be break. Accordingly, a valve that checks a flow in a forward direction if high-pressure fluid is applied (hereunder referred to as "forward check valve") is demanded.

In the pressure reducing valve disclosed in Japanese Unexamined Patent Application Publication No. 2008-59093 and shown in FIGS. 1A and 1B, joints of the members contact a fluid. Therefore, if a highly active fluid, such as methanol, is used in the pressure reducing valve, joining strengths may be reduced when the methanol deteriorates interfaces at the joints of the members. In the worst case, the methanol may leak from locations between the members due to peeling of the members.

More specifically, when each member of the pressure reducing valve in Japanese Unexamined Patent Application Publication No. 2008-59093 is bonded with an adhesive, the adhesive is deteriorated by the methanol, as a result of which each member is peeled. This causes the methanol to leak from the locations between the members. Even if each member of the pressure reducing valve in Japanese Unexamined Patent Application Publication No. 2008-59093 is formed of a metallic material, and each member is subjected to diffusion bonding, the methanol enters very small gaps that remain at the interfaces at the joints of the members, as a result of which the interfaces at the joints of the members are corroded.

Therefore, a method of integrally forming each member of the pressure reducing valve in Japanese Unexamined Patent Application Publication No. 2008-59093 out of silicon that is highly resistant to corrosion by methanol may be considered. However, in this method, since it is necessary to use an expensive semiconductor process, manufacturing costs are increased.

Therefore, when an existing forward check valve having the structure of the pressure reducing valve according to Japanese Unexamined Patent Application Publication No. 2008-59093 is manufactured considering manufacturing costs, and a highly active fluid is used in the forward check valve, fluid control cannot be performed with sufficient reliability.

SUMMARY OF THE INVENTION

Accordingly, preferred embodiments of the present invention provide a forward check valve in which fluid control is performed with increased reliability when a highly active fluid is used, and a fuel cell system including the forward check valve.

A forward check valve according to a preferred embodiment of the present invention includes a valve housing and a diaphragm, a peripheral edge portion of the diaphragm being located on the valve housing, the diaphragm, along with the valve housing, constituting a valve chamber, a central portion of the diaphragm that is provided at an inner side of the peripheral edge portion being displaced by pressure of a fluid in the valve chamber, the valve housing including an inflow hole, through which the fluid flows into the valve chamber, an outflow hole, which is connected to a pump and through which the fluid flows out from the valve chamber by suction pressure of the fluid generated by the pump, and a placement portion, on which the peripheral edge portion of the diaphragm is located, wherein the forward check valve includes a valve body and a cap, the valve body being disposed at the inflow hole and blocking or allowing the flow of the fluid into the valve chamber from the inflow hole by displacement of the diaphragm, the cap being joined to the valve housing, the cap pushing the peripheral edge portion of the diaphragm, and the peripheral edge portion being sandwiched by the cap and the placement portion.

In this structure, when the cap is joined to the valve housing, the peripheral edge portion of the diaphragm is pushed and sandwiched by the cap and the placement portion. As a result, the peripheral edge portion of the diaphragm is compressed by the cap and the placement portion, so that the degree of contact at a contact portion between the placement portion and the peripheral edge portion of the diaphragm is increased.

Therefore, it is possible to prevent leakage of the fluid to the outer side of the peripheral edge portion when the fluid passes between the placement portion and the peripheral edge portion of the diaphragm. That is, in the forward check valve in this structure, joints of the members including a joint of the cap and the valve housing do not contact the fluid. Consequently, even if a highly active fluid is used in the forward check valve, a reduction in joining strengths occurring when the interfaces at the joints of the members are deteriorated by the fluid does not occur, so that leakage of the fluid from locations between the members occurring when the members are peeled does not occur.

Thus, according to this structure, it is possible to increase the reliability with which fluid control is performed when a highly active fluid is used. Since the forward check valve in this structure is not formed of silicon and, thus, can be manufactured without using a semiconductor process, it is possible to manufacture the forward check valve at a low cost.

It is preferable that a material of the diaphragm be rubber, for example.

In this structure, the compression amount of the peripheral edge portion of the diaphragm is large when the peripheral edge portion of the diaphragm is pushed and sandwiched by the cap and the placement portion. Therefore, the degree of contact at the contact portion between the peripheral edge portion of the diaphragm and the placement portion becomes very high. Consequently, it is possible to further prevent leakage of the fluid to the outer side of the peripheral edge portion when the fluid passes between the placement portion and the peripheral edge portion of the diaphragm. Thus, it is possible to further increase the reliability with which fluid control is performed.

When a liquid is used as a fluid in the forward check valve, the surface tension of the liquid is high. Therefore, a fluid flow path that is larger than that when a gas is used as a fluid in the forward check valve is required.

However, in the forward check valve in this structure, the material of the diaphragm preferably is rubber. Therefore, a movable range of the diaphragm is larger than that when the diaphragm is formed of silicon or metal. Consequently, in the forward check valve in this structure, it is possible to provide a sufficient fluid flow path.

It is preferable that a shape of the diaphragm be such that the peripheral edge portion is thicker than the central portion.

Since the peripheral edge portion of the diaphragm is compressed by the cap and the placement portion, it is preferable that the peripheral edge portion be thicker than the central portion as in this structure.

It is preferable that a material of the cap be metal, a material of a portion of the valve housing that contacts the fluid be resin, a material of the valve housing that does not contact the fluid be metal, and the cap be joined to the portion of the valve housing that does not contact the fluid.

In this structure, even if the fluid passes the valve chamber, metallic ions are not eluted in the fluid. Therefore, according to this structure, deterioration of the characteristics of DMFC caused by the elution of the metallic ions does not occur.

It is preferable that the cap be joined to the portion of the valve housing that does not contact the fluid by welding.

It is preferable that the cap and the valve housing be joined at a portion that is situated closer to an outer peripheral side than the placement portion is and that does not contact the fluid.

According to this structure, since the joint of the cap and the valve housing is positioned closer to the outer peripheral side than the placement portion, where the peripheral edge portion of the diaphragm is located, is, the joint is structurally situated away from the position where the fluid exists. Therefore, the joint of the cap and the valve housing has a lower tendency to contact the fluid. Consequently, even if a highly active fluid is used in the forward check valve, it is possible to reliably prevent a reduction in joining strengths occurring when the interfaces at the joints of the members are deteriorated by the fluid.

It is preferable that the fluid be methanol, for example.

Methanol is a highly active fluid compared to other fluids. Therefore, the structure described above is preferable in that the structure that preferably uses methanol as a fluid.

A fuel cell system according to another preferred embodiment of the present invention includes the following structure for solving the aforementioned problem. The fuel cell system preferably includes the forward check valve according to any one of the preferred embodiments described above, a fuel storage section that is connected to the inflow hole of the forward check valve, and a pump that is connected to the outflow hole of the forward check valve.

With this structure, when the forward check valve according to any one of the preferred embodiments described above is used, the fuel cell system including the forward check valve also provides the same advantages as those described above.

According to various preferred embodiments of the present invention, it is possible to increase the reliability with which fluid control is performed when a highly active fluid is used.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First, the principal of operation of a forward check valve according to a preferred embodiment of the present invention and preferably provided for passive driving and used in a small fuel cell will be described.

Figure 1A:
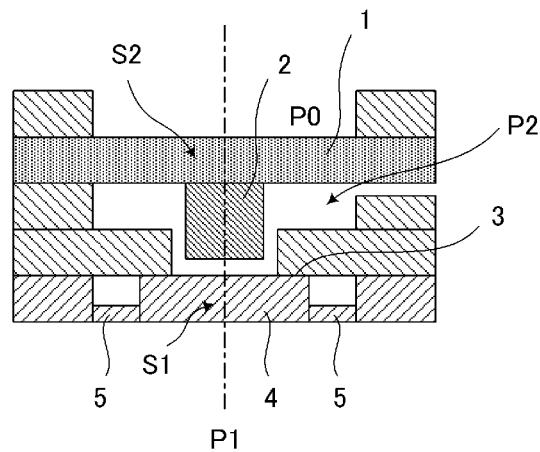
FIGS. 1A and 1B are sectional views illustrating the structure of a forward check valve in Japanese Unexamined Patent Application Publication No. 2008-59093.
Figure 1B:
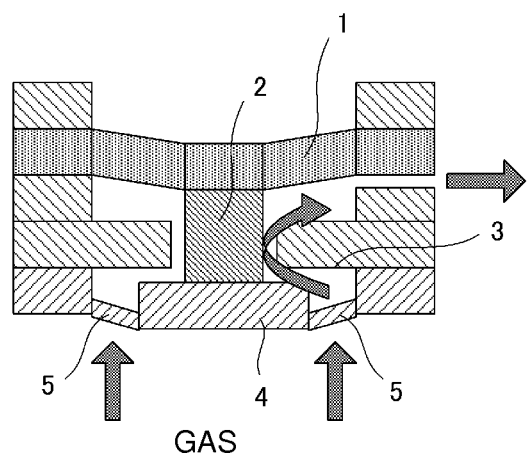
Figure 2A:
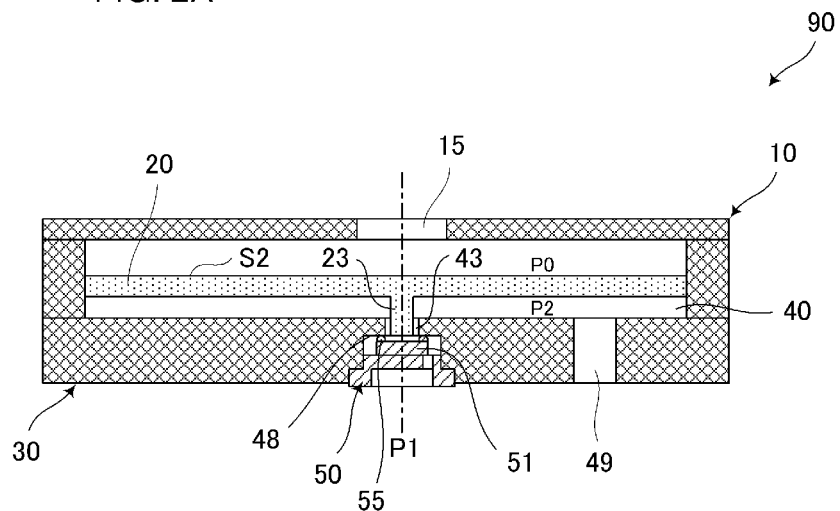
FIGS. 2A and 2B are schematic sectional views of the forward check valve illustrating the principal of operation of the forward check valve.
Figure 2B:
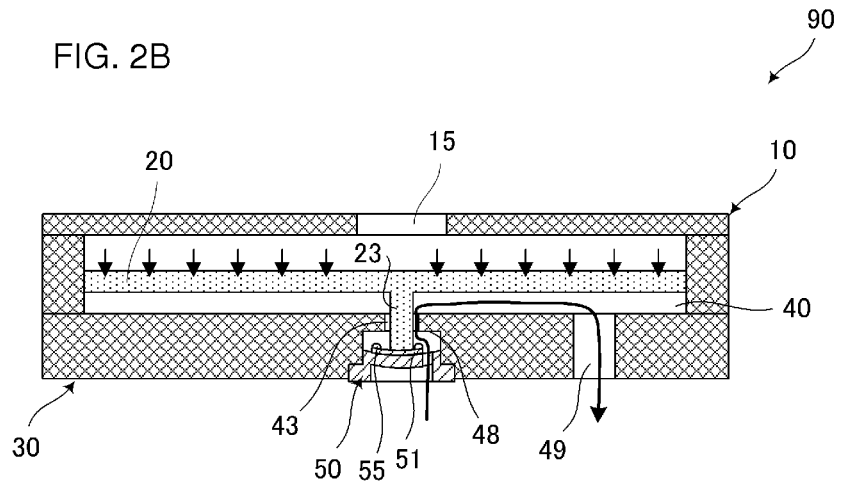

FIG. 2A is a schematic sectional view of a forward check valve 90 in a closed state. FIG. 2B is a schematic sectional view of the forward check valve 90 in an open state.

The forward check valve 90 includes a diaphragm 20, a valve housing 30, a cap 10, and a valve portion 50. The diaphragm 20 is a movable section. The diaphragm 20 and the valve housing 30 constitute a valve chamber 40. The cap 10 is joined to the valve housing 30. The valve portion 50 includes a valve body 51.

The valve housing 30 includes an inflow hole 43, through which a fluid flows into the valve chamber 40, and an outflow hole 49, which is connected to a pump and through which the fluid flows out from the valve chamber 40 by suction pressure of the fluid generated by the pump.

The diaphragm 20 includes a pusher 23, defining and serving as a transmission mechanism, and is displaced by the pressure of the fluid in the valve chamber 40. When the diaphragm 20 is displaced in a direction in which the diaphragm 20 moves towards the valve portion 50, the pusher 23 pushes down the valve body 51.

The valve portion 50 includes an annular valve protrusion 55 at a side of the valve body 51 facing the inflow hole 43, and is disposed so that the valve protrusion 55 contacts a valve seat 48 that is positioned at a peripheral edge defining the inflow hole 43. The valve body 51 contacts or separates from the valve seat 48 due to the displacement of the diaphragm 20, so that the flow of the fluid into the valve chamber 40 from the inflow hole 43 is blocked or allowed.

A hole 15 that opens to outside air is formed in a top surface of the cap 10. As a result, atmospheric pressure is applied to a top portion of the diaphragm 20.

The forward check valve 90 is structured so that, when the pressure of the fluid becomes a set pressure, the forward check valve 90 makes use of a pressure difference to automatically open or close the valve portion 50. More specifically, atmospheric pressure at the top portion of the diaphragm 20 is P0, primary pressure at an upstream side of the valve is P1, pressure at a downstream side of the valve is P2, the area of the valve body 51 (here, the area that is determined by the diameter of a region surrounded by the annular valve protrusion 55 because the valve body 51 is provided with the annular valve protrusion 55) is S1, the area of the diaphragm 20 is S2, and a force that urges the valve body 51 upward is Fs. Here, from the equilibrium of the pressures, as shown in FIG. 2B, the condition for opening the valve portion 50 is $(P1-P2)S1+Fs<(P0-P2)S2$. If P2 is higher than the pressure of this condition, the valve portion 50 closes, whereas, if P2 is lower than the pressure of this condition, the valve portion 50 opens. This makes it possible to maintain P2 at a constant value.

First Preferred Embodiment

The forward check valve 101 according to the first preferred embodiment of the present invention will be described below.

Figure 3:
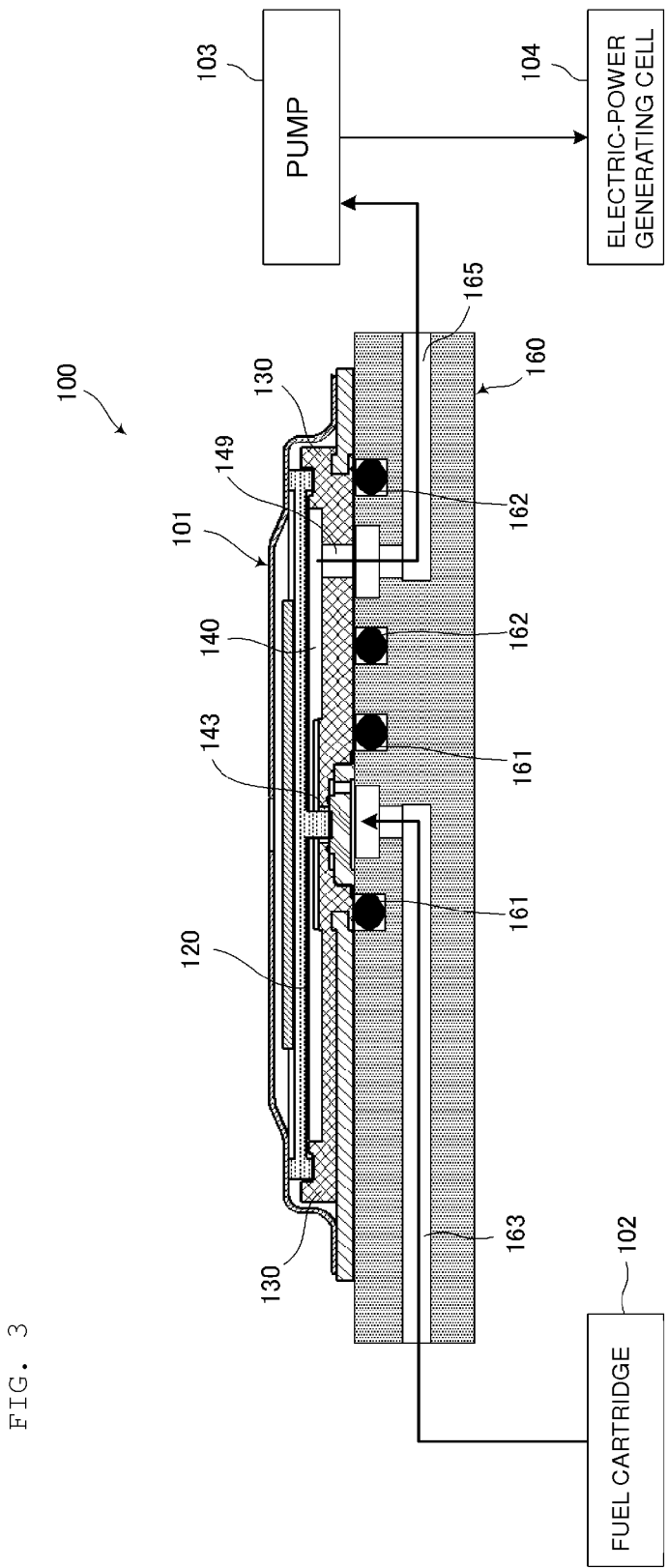
FIG. 3 shows the structure of a fuel cell system including a forward check valve 101 according to a first preferred embodiment of the present invention.

FIG. 3 shows the structure of a fuel cell system 100 including the forward check valve 101 according to the first preferred embodiment of the present invention. The fuel cell system 100 includes a fuel cartridge 102, the forward check valve 101, a pump 103, and an electric-power generating cell 104. The fuel cartridge 102 preferably stores methanol serving as a fuel. The pump 103 transports the methanol. The electric-power generating cell 104 generates electric power when the methanol is supplied thereto from the pump 103.

A direct methanol fuel cell (DMFC) includes the pump 103 that transports methanol serving as a fuel. In general, although the valve-system pump 103 is provided with a valve non-returning function, the valve-system pump 103 is not provided with a valve forward check function. If the pump 103 that is not provided with a forward check function is used, when upstream-side pressure (pressure in a forward direction) is applied to the methanol, the methanol flows even when the pump 103 is not operating.

Therefore, it is preferable to use, in combination with the pump 103, the forward check valve 101 that opens and closes by making use of pump pressure.

Although described in detail below, the forward check valve 101 includes the valve housing 130 which, along with a diaphragm 120, constitutes a valve chamber 140. The valve housing 130 includes an inflow hole 143, to which the fuel cartridge 102 is connected through an inflow path 163, and an outflow hole 149, to which the pump 103 is connected through an outflow path 165. Through O rings 161 and 162 that prevent flow leakage, the forward check valve 101 is surface-mounted to a system housing 160, which includes the inflow path 163 and the outflow path 165 and which is preferably formed of polyphenylene sulfide (PPS) resin, for example.

In the fuel cell system 100, methanol flows into the valve chamber 140 from the fuel cartridge 102 through the inflow path 163 and the inflow hole 143. Through the outflow path 165 and the outflow hole 149, the methanol flows out from the valve chamber 140 to the pump 103 by suction pressure of the methanol generated by the pump 103. Then, the methanol is supplied to the electric-power generating cell 104 by the pump 103.

Figure 4:
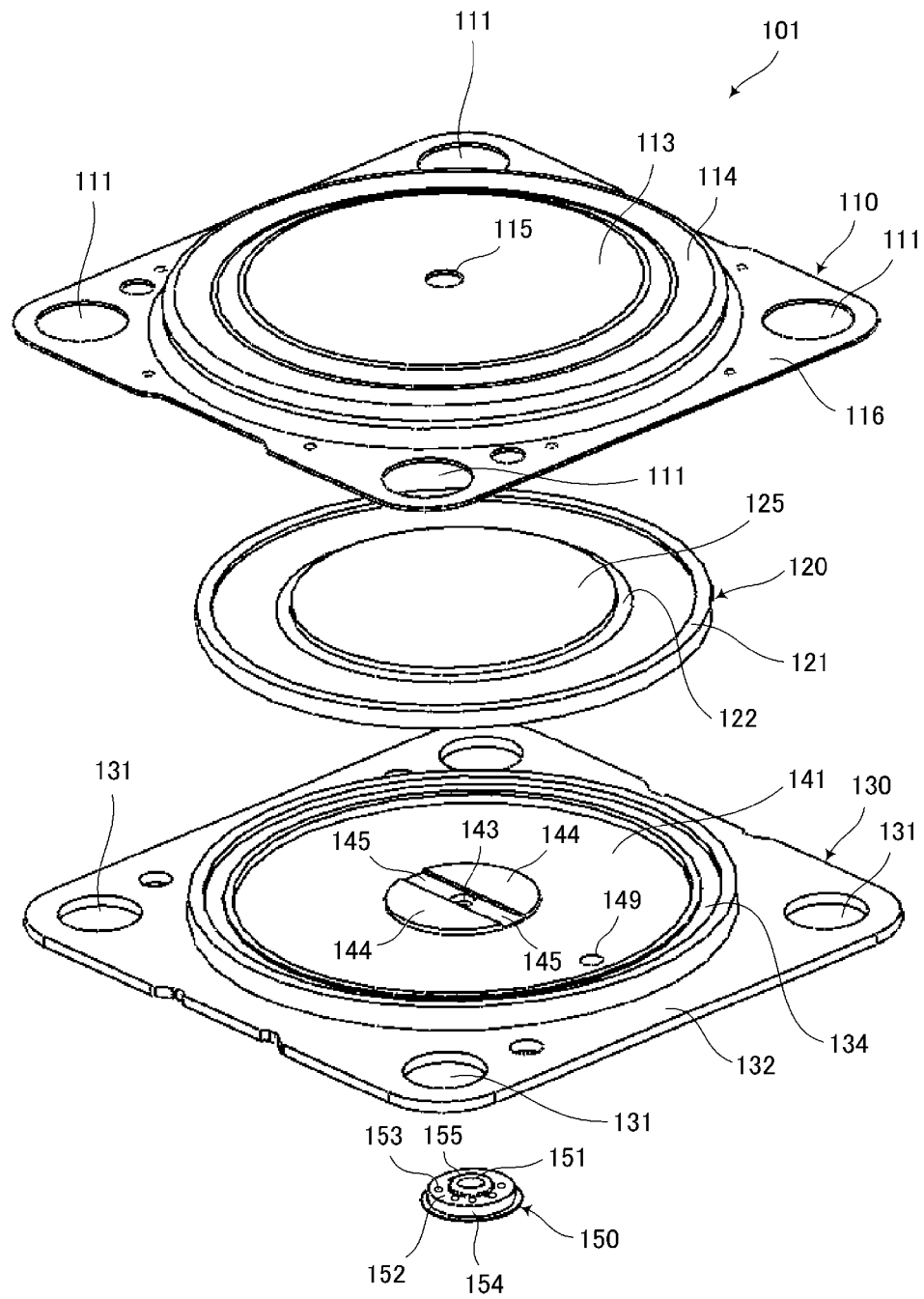
FIG. 4 is an exploded perspective view illustrating the structure of the forward check valve 101 according to the first preferred embodiment of the present invention.
Figure 5A:
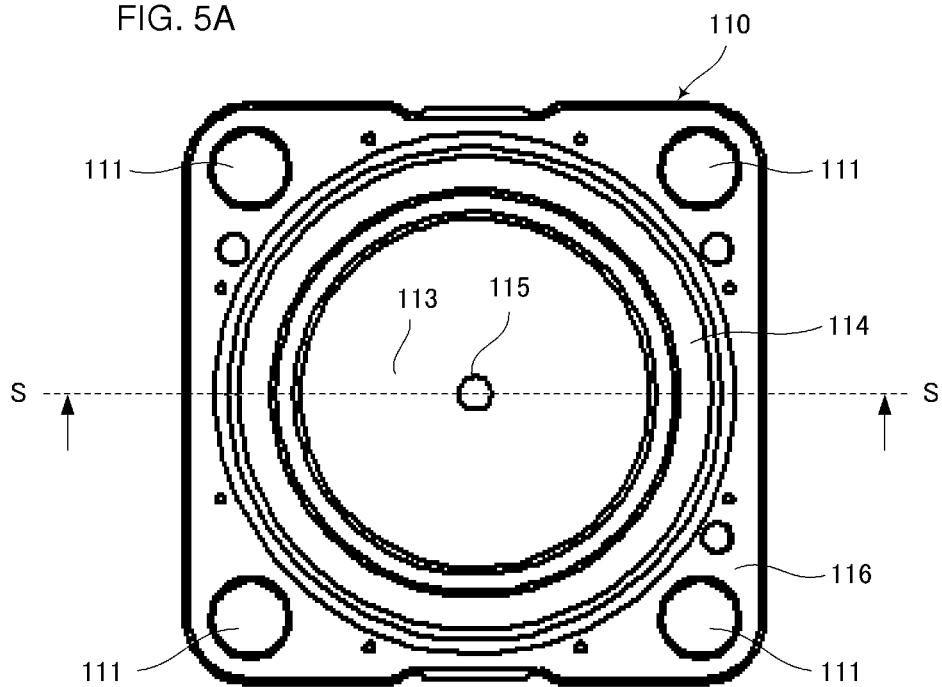
FIG. 5A is a top view of a cap 110 provided at the forward check valve 101 shown in FIG. 4.
Figure 5B:
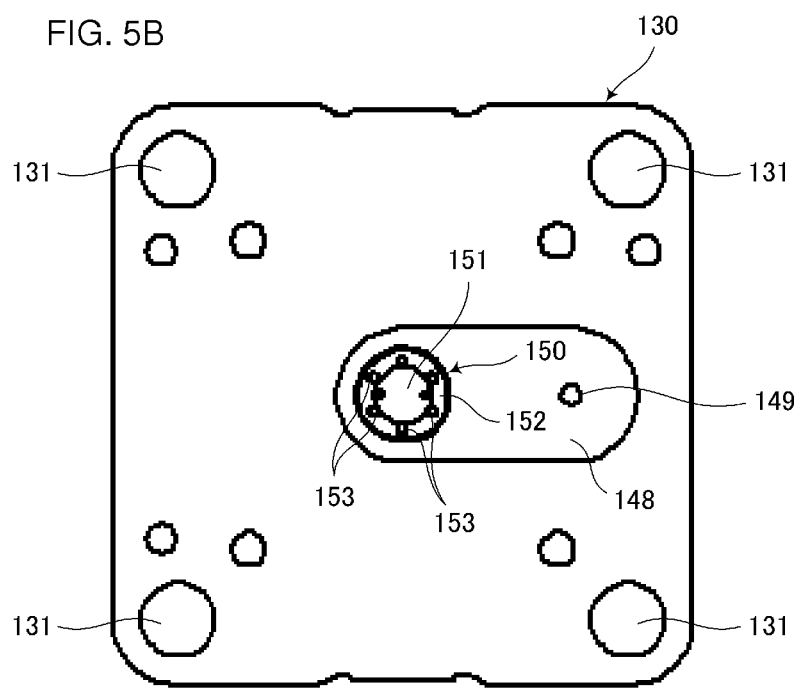
FIG. 5B is a bottom view of a valve housing 130 provided at the forward check valve 101 shown in FIG. 4.
Figure 6:
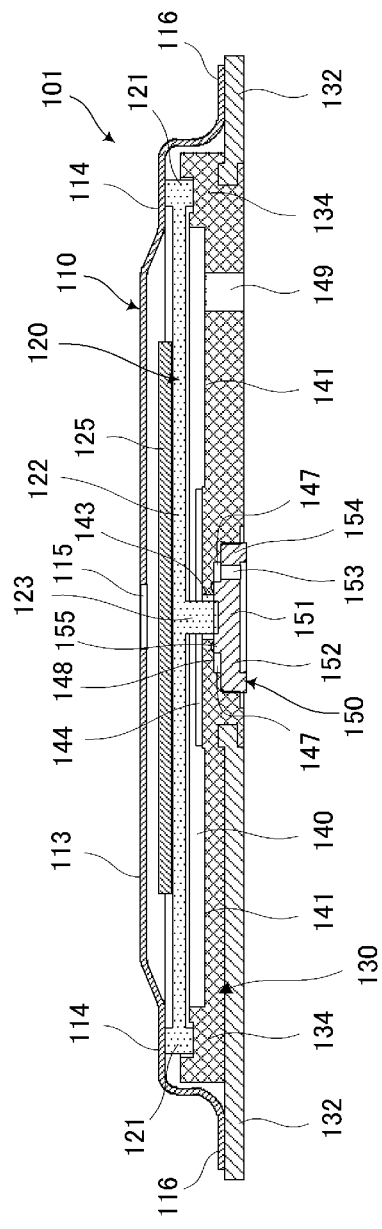
FIG. 6 is a sectional view taken along line S-S in FIG. 5A.

FIG. 4 is an exploded perspective view of the forward check valve 101 according to the first preferred embodiment. FIG. 5A is a top view of the cap 110 provided at the forward check valve 101 shown in FIG. 4. FIG. 5B is a bottom view of the valve housing 130 provided at the forward check valve 101 shown in FIG. 4. FIG. 6 is a sectional view taken along line S-S in FIG. 5A.

As shown in the exploded perspective view of FIG. 4, the forward check valve 101 includes the cap 110, the diaphragm 120, defining and serving as a movable section, the valve housing 130, and a valve portion 150.

The valve housing 130 preferably has a square or substantially square plate shape. The valve housing 130 includes the inflow hole 143, through which a fluid flows into the valve chamber 140, and the outflow hole 149, to which the pump 103 is connected and through which the fluid flows out from the valve chamber 140 by suction pressure of the fluid generated by the pump 103. The valve housing 130 also includes screw fixation holes 131, which are used to fix the cap 110 and the valve housing 130 to the system housing 160, and a placement portion 134, on which a peripheral edge portion 121 of the diaphragm 120 is located. As shown in FIGS. 4 and 6, a protrusion 144, with which the diaphragm 120 contacts when the valve portion 150 allows the methanol to flow into the valve chamber 140 from the inflow hole 143, and a flow path 145, which allows the methanol to pass from an inner side to an outer side of the protrusion 144 when the valve portion 150 allows the methanol to flow into the valve chamber 140 from the inflow hole 143, are arranged at a periphery of the inflow hole 143 at a bottom surface 141 of the valve chamber 140 that opposes the diaphragm 120. As shown in FIG. 5B and FIG. 6, the valve housing 130 also includes an opening 147, which accommodates the valve portion 150 by fitting the valve portion 150 from a mount surface side of the valve housing 130, and a valve seat 148, which is positioned at a peripheral edge defining the inflow hole 143.

The materials of the valve housing 130 preferably are such that the portions 134, 141, 144, 145, and 148 of the valve housing 130 that contact methanol are formed of resin that is highly resistant to methanol, such as polyphenylene sulfide (PPS) resin, and edge portions 132 of the valve housing 130, which are portions of the valve housing 130 that do not contact the methanol, are formed of metal, for example. The valve housing 130 is formed preferably by insert molding in which the edge portions 132, which are metallic portions, are inserted into a mold and subjected to injection molding.

As shown in FIGS. 4 and 6, the diaphragm 120 includes a pusher 123, defining and serving as a transmission mechanism, at a center thereof, and includes a disc whose peripheral edge portion 121 is thicker than its central portion 122. The diaphragm 120 is preferably formed of rubber that is highly resistant to methanol, such as ethylene propylene rubber or silicone rubber, for example. The diaphragm 120 has its peripheral edge portion 121 located on the valve housing 130, and constitutes, along with the valve housing 130, the valve chamber 140. The central portion 122 that is provided at an inner side of the peripheral edge portion 121 is displaced by the pressure of the fluid in the valve chamber 140. When the central portion 122 of the diaphragm 20 is displaced in a direction in which the diaphragm 20 moves towards the valve portion 150, the pusher 123 pushes down the valve body 151.

When a liquid is used as a fluid in the forward check valve 101, since the surface tension of the liquid is high, a fluid flow path that is larger than that when a gas is used as a fluid in the forward check valve 101 is used. However, in the forward check valve 101 according to the preferred embodiment, the material of the diaphragm 120 preferably is rubber, for example. Therefore, a movable range of the diaphragm 120 is larger than that when the diaphragm 120 is formed of silicon or metal. Consequently, in the forward check valve 101 according to the present preferred embodiment, it is possible to provide a sufficient flow path for methanol.

As shown in FIGS. 4 and 6, the valve portion 150 is substantially circular, and preferably is formed of rubber that is highly resistant to methanol, such as silicone rubber, for example. The valve portion 150 includes the valve body 151, a supporting portion 152, holes 153, and a fixation portion 154. The valve body 151 contacts or separates from the valve seat 148 due to the displacement of the diaphragm 120, so that the flow of the fluid (methanol) into the valve chamber 140 from the inflow hole 143 is blocked or allowed. The supporting portion 152 supports the valve body 151 so that the valve body 151 is movable in directions in which the valve body 151 moves towards and away from the valve seat 148. The holes 153 allow the methanol to pass therethrough. When the valve portion 150 is accommodated in the opening 147, the fixation portion 154 contacts an inner peripheral surface defining the opening 147 of the valve housing 130 to fix the supporting portion 152.

In order to increase sealability with respect to the valve seat 148, the valve body 151 is provided with an annular valve protrusion 155 at a side of the inflow hole 43. However, the valve protrusion 155 does not necessarily need to be provided.

The valve body 151 is such that, when the valve portion 150 is accommodated in the opening 147, the valve protrusion 155 of the valve body 151 contacts the valve seat 148, so that the valve portion 151 applies pressure to the valve seat 148 in the direction in which the flow of the fluid from the inflow hole 143 into the valve chamber 140 is blocked when the valve is closed. When the diaphragm 120 moves downward and pushes down the valve body 151, the valve body 151 separates from the valve seat 148. This causes the inflow hole 143 and the holes 153 to communicate with each other, so that the methanol is allowed to flow into the valve chamber 140.

As shown in FIG. 4, FIG. 5A, and FIG. 6, the cap 110 preferably has a square or substantially square plate shape, and is preferably formed by, for example, molding with a mold using a stainless steel plate. The cap 110 includes screw fixation holes 111 to fix the cap 110 and the valve housing 130 to the system housing 160. Here, with the diaphragm 120 being located on the placement portion 134, edge portions 116 of the metallic cap 110 are joined to metallic edge portions 132 of the valve housing 130 by welding, for example. When a peripheral edge portion 114 of the cap 110 is joined, the peripheral edge portion 114 pushes the peripheral edge portion 121 of the diaphragm 120, and the peripheral edge portion 121 is sandwiched by the peripheral edge portion 114 and the placement portion 134.

A central portion 113 of the cap 110 includes a hole 115 that opens to outside air. As a result, atmospheric pressure is applied to a top portion of the diaphragm 120.

A circular pressure receiving plate 125 that is preferably formed of metal and that receives a differential pressure between the atmospheric pressure and internal pressure in the valve chamber 140 is joined to the diaphragm 120.

Similarly to the above-described forward check valve 90 (see FIG. 2), the forward check valve 101 is arranged so that, when the pressure of a fluid becomes a set pressure, the forward check valve 101 makes use of the pressure difference to automatically open or close the valve portion 150.

In the aforementioned structure, when the edge portions 116 of the cap 110 are joined to the edge portions 132 of the valve housing 130 preferably by laser welding, the peripheral edge portion 121 of the diaphragm 120 is pushed and sandwiched by the peripheral edge portion 114 of the cap 110 and the placement portion 134. The material of the diaphragm 120 preferably is rubber, for example. As a result, the peripheral edge portion 121 of the diaphragm 120 is compressed by the peripheral edge portion 114 of the cap 110 and the placement portion 134, so that the degree of contact at a contact portion between the placement portion 134 and the peripheral edge portion 121 of the diaphragm 120 becomes very high.

Therefore, leakage of methanol to the outer side from the valve housing 130 when the methanol passes between the placement portion 134 and the peripheral edge portion 121 of the diaphragm 120 does not occur. That is, a joint of the cap 110 and the valve housing 130 is positioned closer to an outer peripheral side than the placement portion 134, where the peripheral edge portion 121 of the diaphragm 120 is located. Consequently, the joint is structurally situated away from the position where the fluid exists. Thus, in the forward check valve 101 in the present preferred embodiment, joints of the members including joints of the edge portions 116 of the cap 110 and the edge portions 132 of the valve housing 130 do not contact methanol. As a result, even if a highly active fluid, such as methanol, is used in the forward check valve 101, a reduction in joining strengths occurring when interfaces at the joints of the members are deteriorated by the methanol does not occur, so that leakage of the methanol from locations between the members occurring when the members are peeled does not occur.

Therefore, according to the forward check valve 101 in the present preferred embodiment, it is possible to increase the reliability with which fluid control is performed when a highly active fluid is used. Since the forward check valve 101 in the present preferred embodiment is not formed of silicon and, thus, can be manufactured without using a semiconductor process, it is possible to manufacture the forward check valve at a low cost.

In the above-described structure, the portions 134, 141, 144, 145, and 148 of the valve housing 130 that contact methanol preferably are all formed of resin, and the diaphragm 120 and the valve portion 150 preferably are formed of rubber. Therefore, metallic ions are not eluted in the methanol. Consequently, in the forward check valve 101 according to the present preferred embodiment, deterioration of the characteristics of the DMFC caused by the elution of the metallic ions does not occur.

Thus, when the forward check valve 101 according to the present preferred embodiment is used, the fuel cell system 100 including the forward check valve 101 also provides the same advantages as those described above.

Second Preferred Embodiment

Figure 7:
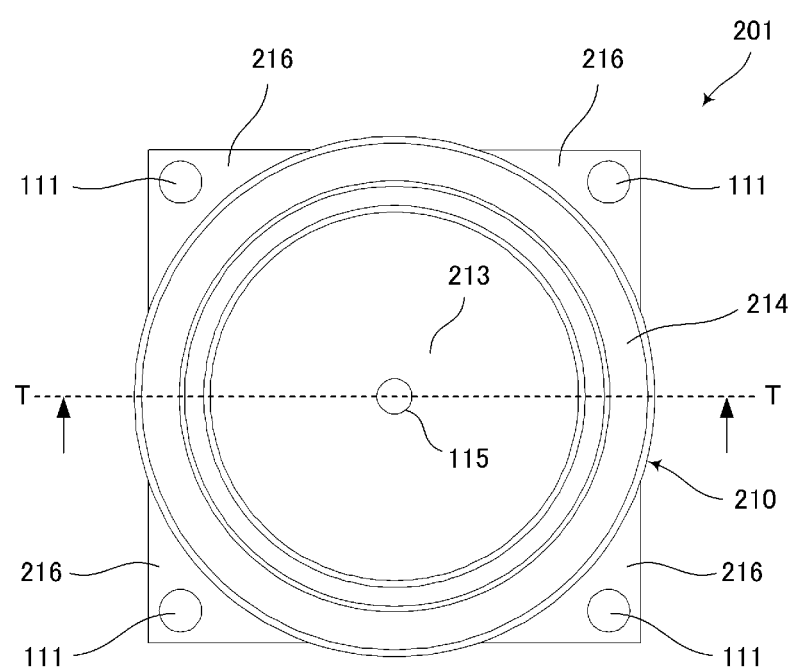
FIG. 7 is a top view of a cap 210 provided at a forward check valve 201 according to a second preferred embodiment of the present invention.
Figure 8:
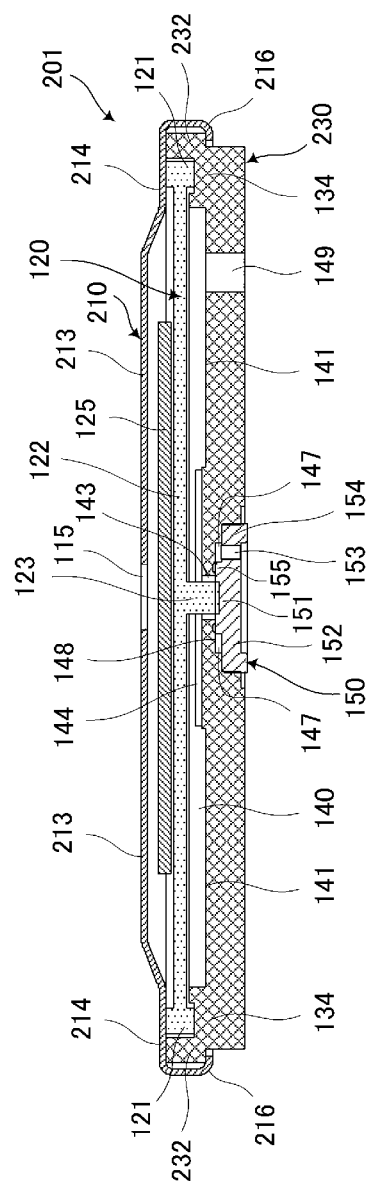
FIG. 8 is a sectional view taken along line T-T in FIG. 7.

FIG. 7 is a top view of the cap 210 provided at the forward check valve 201 according to the second preferred embodiment of the present invention. FIG. 8 is a sectional view taken along line T-T in FIG. 7. The forward check valve 201 in the present preferred embodiment differs from the forward check valve 101 in that the method of joining the cap 210 and a valve housing 230 differs.

More specifically, the valve housing 230 differs from the valve housing 130 shown in FIG. 6 in that the entire valve housing 230 preferably is formed of resin that is highly resistant to methanol and includes an annular edge portion 232 that is thicker than a peripheral edge portion 121 of a diaphragm 120 and that is disposed at an outer side of the peripheral edge portion 121.

Further, an edge portion 216 of the cap 210 is joined and secured to the edge portion 232 of the valve housing 230 preferably by caulking so that, with the diaphragm 120 being located on a placement portion 134, the metallic cap 210 surrounds the edge portion 232 of the valve housing 230 formed of resin. When a peripheral edge portion 214 of the cap 210 is joined, the peripheral edge portion 214 pushes the peripheral edge portion 121 of the rubber diaphragm 120, and the peripheral edge portion 121 is sandwiched by the peripheral edge portion 214 and the placement portion 134. In addition, when the peripheral edge portion 214 of the cap 210 is joined, the peripheral edge portion 214 pushes the edge portion 232 of the valve housing 230, and the edge portion 232 is sandwiched by the peripheral edge portion 214 and the edge portion 216 of the cap 210. Since a joint of the cap 210 and the valve housing 230 is positioned closer to an outer peripheral side than the placement portion 134, where the peripheral edge portion 121 of the diaphragm 120 is located, the joint is structurally situated away from the position where the fluid exists.

Therefore, even in the forward check valve 201 according to the present preferred embodiment, joints of the members including a joint of the edge portion 216 of the cap 210 and the edge portion 232 of the valve housing 230 do not contact methanol. Consequently, even if a highly active fluid, such as methanol, is used in the forward check valve 201, a reduction in joining strengths occurring when interfaces at the joints of the members are deteriorated by the methanol does not occur, so that leakage of the methanol from locations between the members occurring when the members are peeled does not occur.

Consequently, even the forward check valve 201 according to the present preferred embodiment provides the same advantages as the forward check valve 101. When the forward check valve 201 according to the present preferred embodiment is used, the fuel cell system including the forward check valve 201 also provides the same advantages as those described above.

Third Preferred Embodiment

Figure 9:
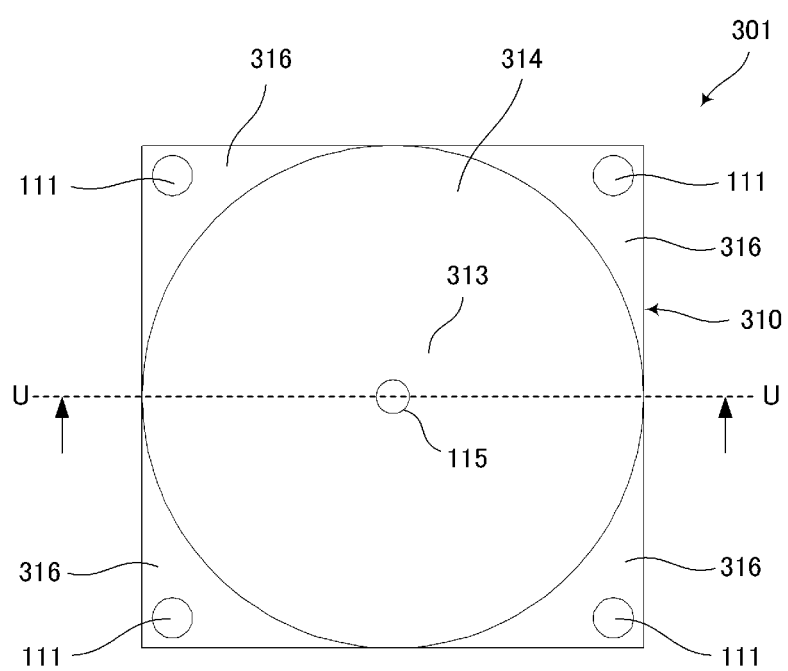
FIG. 9 is a top view of a cap 310 provided at a forward check valve 301 according to a third preferred embodiment of the present invention.
Figure 10:
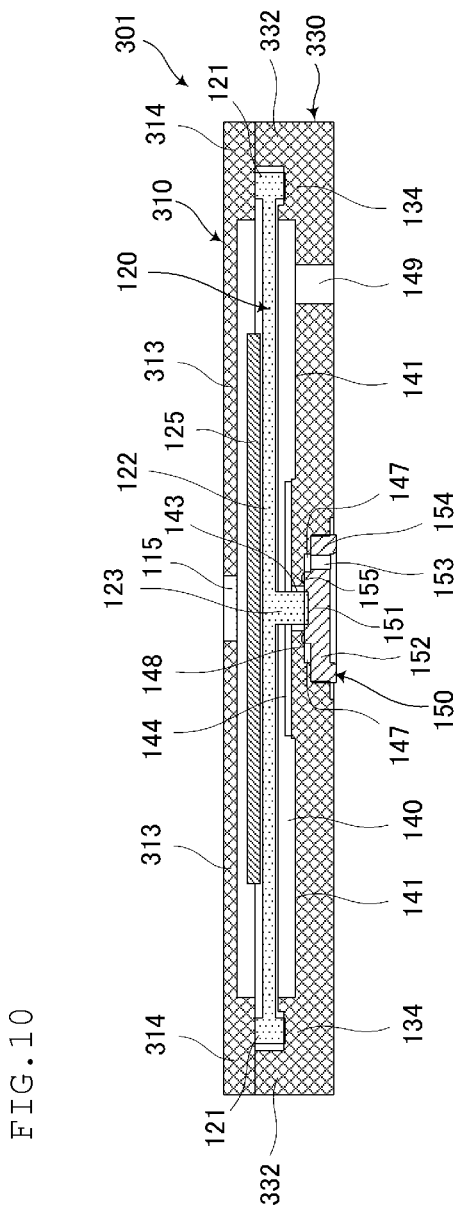
FIG. 10 is a sectional view taken along line U-U in FIG. 9.

FIG. 9 is a top view of the cap 310 provided at the forward check valve 301 according to the third preferred embodiment of the present invention. FIG. 10 is a sectional view taken along line U-U in FIG. 9. The forward check valve 301 in the present preferred embodiment differs from the forward check valve 101 in that the method of joining the cap 310 and a valve housing 330 differs.

More specifically, the valve housing 330 differs from the valve housing 130 shown in FIG. 6 in that the entire valve housing 330 preferably is formed of resin that is highly resistant to methanol and includes an annular edge portion 332 that is thicker than a peripheral edge portion 121 of a diaphragm 120 and that is disposed at an outer side of the peripheral edge portion 121.

Further, the cap 310 differs from the cap 110 shown in FIGS. 5A and 6 in that the entire cap 310 preferably is formed of resin that is highly resistant to methanol. The shape of the cap 310 is such that a peripheral edge portion 314 is thicker than a central portion 313.

With the diaphragm 120 being located on a placement portion 134, the edge portion 314 of the cap 310, formed of resin, preferably is welded or bonded to a top surface of an edge portion 332 of the valve housing 330, formed of resin. When the peripheral edge portion 314 of the cap 310 is joined, the peripheral edge portion 314 pushes the peripheral edge portion 121 of the rubber diaphragm 120, and the peripheral edge portion 121 is sandwiched by the peripheral edge portion 314 and the placement portion 134. Since a joint of the cap 310 and the valve housing 330 is positioned closer to an outer peripheral side than the placement portion 134, where the peripheral edge portion 121 of the diaphragm 120 is located, the joint is structurally situated away from the position where the fluid exists.

Therefore, even in the forward check valve 301 in the present preferred embodiment, joints of the members including a joint of the peripheral edge portion 314 of the cap 310 and the edge portion 332 of the valve housing 330 do not contact methanol. Consequently, even if a highly active fluid, such as methanol, is used in the forward check valve 301, a reduction in joining strengths occurring when interfaces at the joints of the members are deteriorated by the methanol does not occur, so that leakage of the methanol from locations between the members occurring when the members are peeled does not occur.

Consequently, even the forward check valve 301 according to the present preferred embodiment provides the same advantages as the forward check valve 101. When the forward check valve 301 according to the present preferred embodiment is used, the fuel cell system including the forward check valve 301 also provides the same advantages as those described above.

Other Preferred Embodiments

Although, in the various preferred embodiments above, methanol is preferably used as a highly active fluid, the fluid may be, for example, a gas, a liquid, a gas-liquid mixture flow, a liquid-solid mixture flow, or a solid-gas mixture flow.

In each of the preferred embodiments described above, the shape of the diaphragm 120 preferably is such that the peripheral edge portion 121 is thicker than the central portion 122. However, actually speaking, the shape of the diaphragm 120 may be such that the peripheral edge portion 121 is thinner than the central portion 122 or such that the thickness of the peripheral edge portion 121 and the thickness of the central portion 122 are the same.

The descriptions of the above-described preferred embodiments are exemplifications on all points, and are not to be construed in a limiting sense. The scope of the present invention is defined by the scope of the claims rather than by the above-described preferred embodiments. Further, the scope of the present invention is to include the scope of the claims and equivalents thereof and all changes that fall within the scope.

Further, while preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A forward check valve comprising:
a valve housing;
a diaphragm including a peripheral edge portion located on the valve housing;
a valve body that is a separate element from the diaphragm; and
a cap; wherein
the diaphragm and the valve housing are arranged to define a valve chamber;
a central portion of the diaphragm that is provided at an inner side of a peripheral edge portion is arranged to be displaced by pressure of a fluid in the valve chamber;
the valve housing includes an inflow hole through which the fluid flows into the valve chamber, an outflow hole connected to a pump and through which the fluid flows out from the valve chamber by suction pressure of the fluid generated by the pump, and a placement portion on which the peripheral edge portion of the diaphragm is located;
the valve body is disposed at the inflow hole and arranged to block or allow a flow of the fluid into the valve chamber from the inflow hole by displacement of the diaphragm;
the cap is joined to the valve housing and arranged to push the peripheral edge portion of the diaphragm;
a central portion of the cap includes a hole that is open to outside air; and
the peripheral edge portion is sandwiched by the cap and the placement portion.

2. The forward check valve according to claim 1, wherein a material of the diaphragm is rubber.

3. The forward check valve according to claim 1, wherein a shape of the diaphragm is such that the peripheral edge portion is thicker than the central portion.

4. The forward check valve according to claim 1, wherein a material of the cap is metal;
a material of a portion of the valve housing that contacts the fluid is resin;
a material of the valve housing that does not contact the fluid is metal; and
the cap is joined to a portion of the valve housing that does not contact the fluid.

5. The forward check valve according to claim 4, wherein the cap is welded to the portion of the valve housing that does not contact the fluid.

6. The forward check valve according to claim 1, wherein the cap and the valve housing are joined at a portion that is situated closer to an outer peripheral side than the placement portion and that does not contact the fluid.

7. The forward check valve according to claim 1, wherein the fluid is methanol.

8. The forward check valve according to claim 1, wherein the valve housing has a square or substantially square plate shape.

9. The forward check valve according to claim 4, wherein the material of the portion of the valve housing that contacts the fluid is polyphenylene sulfide.

10. The forward check valve according to claim 1, wherein the diaphragm includes a pusher defining a transmission mechanism and a disc including a peripheral edge that is thicker than a central portion thereof.

11. The forward check valve according to claim 1, wherein the valve body includes an annular valve protrusion.

12. The forward check valve according to claim 1, wherein the cap has a square or substantially square plate shape.

13. The forward check valve according to claim 1, further comprising a pressure receiving plate joined to the diaphragm and arranged to receive a differential pressure between atmospheric pressure and a pressure in the valve chamber.

14. The forward check valve according to claim 1, wherein a material of all of the valve housing is resin, the valve housing includes an annular edge portion that is thicker than a peripheral edge of the diaphragm, and the peripheral edge of the diaphragm is arranged to be pushed by a peripheral edge of the cap.

15. The forward check valve according to claim 1, wherein a material of all of the cap is resin and the cap includes a peripheral edge portion that is thicker than a central portion thereof.

16. The forward check valve according to claim 1, wherein the fluid is one of a gas, a liquid, a gas-liquid mixture, a liquid-solid mixture, or a solid-gas mixture.

17. The forward check valve according to claim 1, wherein the peripheral edge portion of the diaphragm is thicker than, thinner than, or the same thickness as the central portion thereof.

18. A fuel cell system comprising:
the forward check valve according to claim 1;
a fuel storage section that is connected to the inflow hole of the forward check valve; and
a pump that is connected to the outflow hole of the forward check valve.

19. The fuel cell system according to claim 18, further comprising an electric-power generating cell arranged to generate power when the fluid is supplied thereto by the pump.

20. The fuel cell system according to claim 18, wherein the fluid is methanol.

* * * * *